United States Patent [19]

Batson

[11] 4,152,961
[45] May 8, 1979

[54] RADIAL SAW

[75] Inventor: William A. Batson, Pickens, S.C.

[73] Assignee: The Singer Company, New York, N.Y.

[21] Appl. No.: 870,534

[22] Filed: Jan. 18, 1978

[51] Int. Cl.² .............................................. B27B 5/20
[52] U.S. Cl. .................................. 83/471.3; 83/486.1
[58] Field of Search ................. 83/471.3, 486.1, 471.2, 83/485, 477.2

[56] References Cited

U.S. PATENT DOCUMENTS

| | | | |
|---|---|---|---|
| 2,317,568 | 4/1943 | Wallace et al. | 83/486.1 X |
| 2,489,420 | 11/1949 | Kirk et al. | 83/486.1 |
| 3,821,918 | 7/1974 | Niehaus et al. | 83/471.3 |
| 3,971,274 | 7/1976 | Barton | 83/471.3 X |

FOREIGN PATENT DOCUMENTS 806663 12/1958 United Kingdom ................... 83/471.3

Primary Examiner—Donald R. Schran
Attorney, Agent, or Firm—R. E. Smith; E. L. Bell; H. Weinstein

[57] ABSTRACT

A radial saw including a table with a work support surface to which a frame is connected below the work support surface. A post is connected to the frame at the rear thereof, and a support arm cantilevers over the table from its post connection. A pair of support rods, one round and one square are affixed to the support arm. A slide is fitted with bearings that will separately journal the round rod in close fit and the square rod in loose fit. A motor for the saw is carried by the slide to be moved therewith in translatory motion across the work support surface. The frame and the post are each angularly adjustable to permit selective straight cutting, or various miter and compound angle cuts.

2 Claims, 5 Drawing Figures

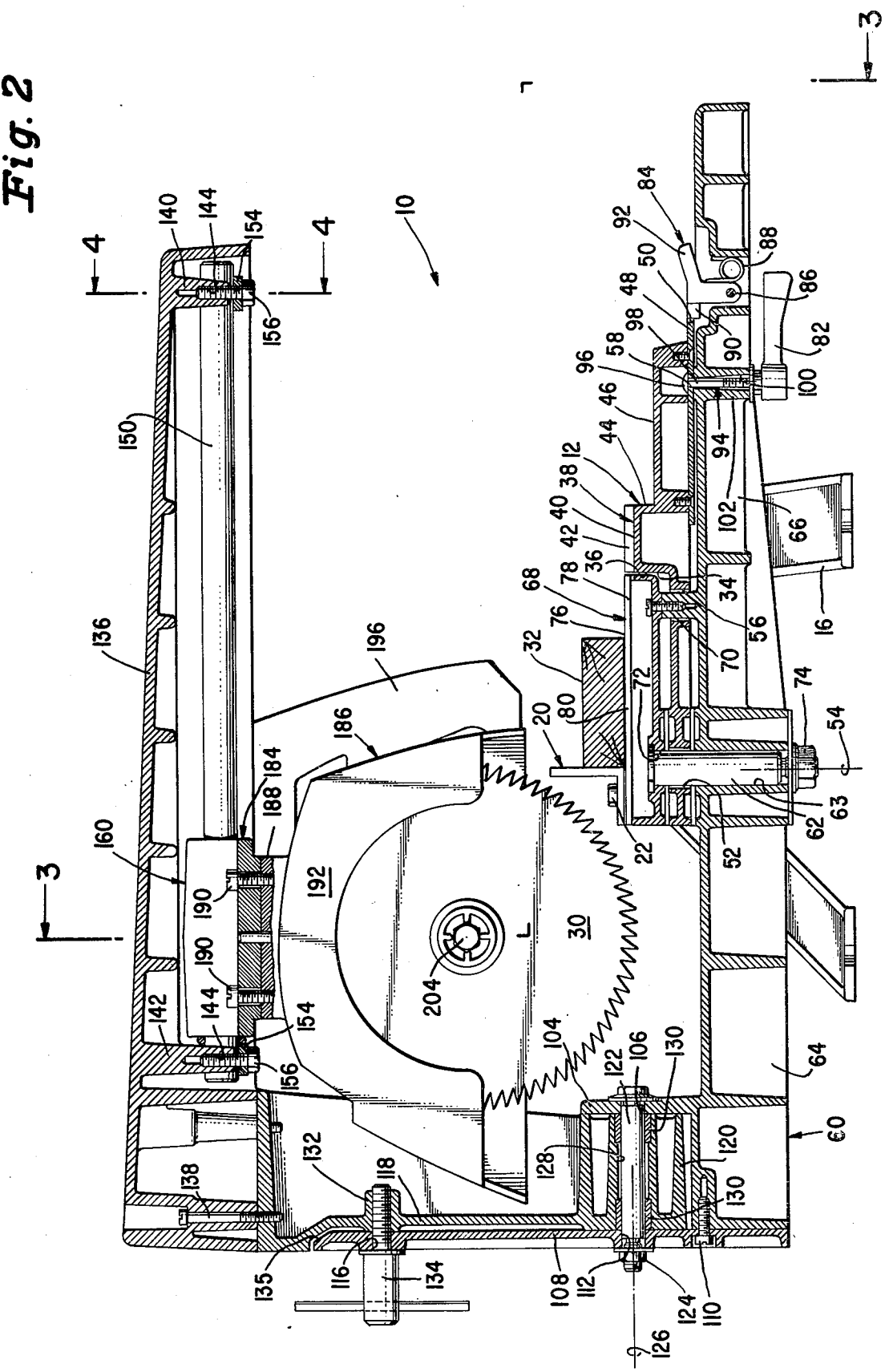

& nbsp;

RADIAL SAW

BACKGROUND OF THE INVENTION

Radial saws of the prior art had various type supports, which included using pairs of support rods. The use of plural rods usually mandated the same bearing tolerance requirements and if a pair of circular rods were used, often they had unequal diameters. In any case the cost was higher and the bearing wear greater than need be. Also, the frame tended to lack the degree of stability demanded for the production of high quality repetitive work.

SUMMARY OF THE INVENTION

It is an object of the present invention to provide an improved radial saw which overcomes the prior art disadvantages; which is simple, economical and reliable; which has improved stability; which uses a pair of support rods, one round and one square; which has a frame pivotably connected to the under side of a table; which frame has a clamp that is connected to the table at predetermined cutting angles, the more popular of which are set with detents to permit repeat settings at such angles; and which has a pivotable post connected to the frame to permit compound angle cuts.

Other objects and advantages would be apparent from the following description of one embodiment of the invention and the novelty features would be particularly pointed out hereinafter in the claims.

BRIEF DESCRIPTION OF THE DRAWINGS

This invention is illustrated in the accompanying drawings in which:

FIG. 2 is a side elevational view, partly in section, of the improved radial saw embodying the present invention.

DESCRIPTION OF THE INVENTION

Figure 1:
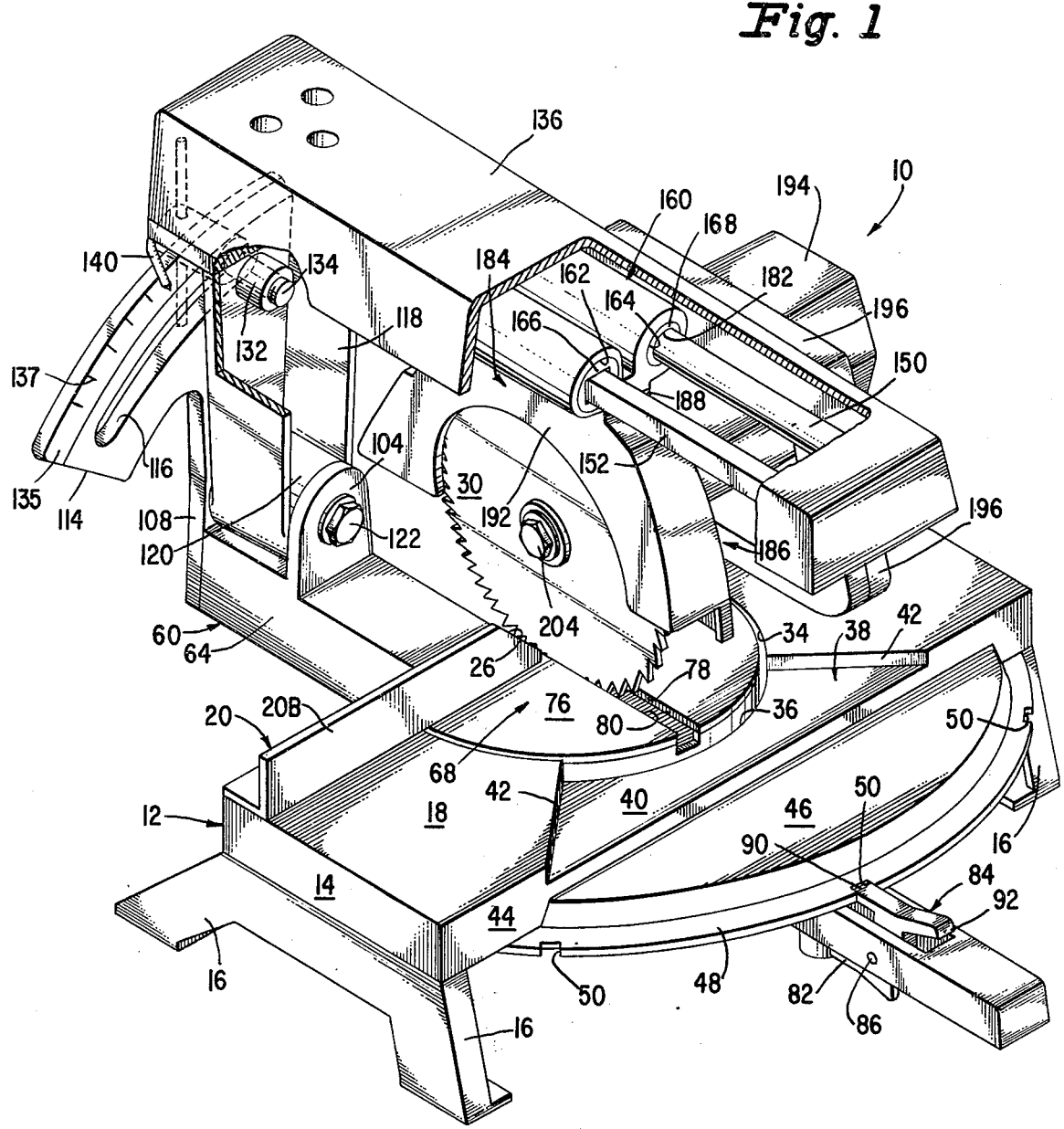
FIG. 1 is a perspective view, partly broken away, of the improved radial saw embodying the present invention.

In the preferred embodiment of the invention illustrated in the drawings a radial saw, designated generally 10 is shown in FIGS. 1 and 2. The saw 10 includes a work table 12 having a base 14 from which a plurality of legs 16 extend downwardly from the corners thereof to rest on a suitable surface (not shown). The top surface 18 of the base 14 defines a work support to which a fence 20 is connected by bolts 22 along the rear edge of the base 14 as shown in FIGS. 1 and 2. The fence 20 is made up of two aligned sections 20A and 20B shown best in FIG. 3 which sections are separated by a central slot 24 having a sloped side 26 on the fence section 20B and a straight side 28 on the section 20A. The sloped side 26 is angled from the bottom upwardly at 45°. The slot 24 permits the passage of a circular saw blade 30 and is shaped to permit straight, miter or compound angle cuts. A workpiece 32 illustrated in FIG. 2 is placed upon the top surface 18 to abut the front face of the fence 20 in which position the workpiece 32 will be cut by the saw blade 30 as the saw 10 is drawn forwardly across the workpiece 32.

A deep recess 34 illustrated in FIGS. 1 and 2 is formed centrally of the top surface 18 with a circular perimeter, the front portion 36 of which communicates with a shallow recess 38 is formed with a flat top surface 40 stepped down from the top surface 18, and having two opposite side walls 42 which slant inwardly toward each other at an angle of 45° from a flat front face 44 of the base 14. A circular apron 46 extends from the front face 44 and has a lower flange 48 extending radially outwardly thereof with a plurality of detents 50 formed thereon which correspond to the straight cut at 0° and also at angles of 45° on either side of the center detent 50. The deep recess 34 has an aperture 52 formed in line with the central detent 50 with the center thereof coincident with a pivotal axis 54. An arcuate slot 56 is formed forwardly of and along a radial line from the axis 54 as illustrated in FIG. 2. A second longer arcuate slot 58 is formed on the under side of the apron 46 with a radial line from the pivot axis 54.

A frame 60 is connected to the work table 12 by a pin 62 extending through the aligned apertures 52 and 63 so as to have the frame pivot about the pivotal axis 54. The frame is a continuous member having a rear section 64 and a forward section 66 formed on either side of the axis 54 as shown in FIG. 2. A frame table 68 is fixed to the forward section 66 by a pin connected rib 70 which extends through the arcuate slot 56 of the table 12. The frame table 68 also has a counterbored aperture 72 aligned with the axis 54 and apertures 52 and 63 to non-rotatably receive the head of the pin 62, the other end of which threadedly receives a nut 74 illustrated in FIGS. 2 and 3. The frame table 68 has a top surface 76 which is aligned with the plane of the top surface 18 of the table base 14. The frame table 68 is disposed in the deep recess 34 and along with the frame 60 is free to turn about the axis 54 relative to the stationary work table 12. The top surface 76 is slotted at 78 to define a cutting channel 80 through which the lower portion of the saw blade 30 will be confined during the cutting operation 30. The frame 60 is selectively clamped in any one of a plurality of horizontal cutting positions by either a forwardly disposed locking lever 82 which can be used for any angle or by a quick clamp 84 pivotably connected to the frame 60 at 86 and bias by a spring 88 to urge a clamp finger 90 into engagement with one of the detents 50 as shown in FIGS. 1 and 2. A forward raised finger 92 is depressed to release the clamp finger 90 from the detent by pivoting the quick clamp 84 about its pivot 86 thus swinging the finger 90 clockwise and raising it out of the detent 50. Upon release of the finger 92 the clamp 84 will again be bias toward the flange 48 and engagement with one of the detent 50. The detents 50 are formed corresponding to a "popular" or frequently used angle such as is shown at 0° and 45° on either size of the 0°, so that the frame 60 may be quickly positioned and clamped at the desired angle of cut. The lock lever 82 threadedly receives the end of a bolt 94, the enlarged head 96 of which is trapped in the arcuate slot 58 of the table 12, and the bolt shank 98 is disposed in an aperture 100 of a rib 102 of the frame 60. When the lever 82 is turned to loosen its connection with the bolt 94 the frame 60 is free to pivot about the axis 54, provided that the quick clamp 84 is disengaged. The bolt 94 is non-rotative in the slot 58, but is free to move within the length of the arcuate slot 58 so as not to impede the adjustment. At the desired angle the lock lever 82 will be turned to tighten the connection with the bolt thus forcing the head 96 to be clamped within the slot 58 to produce a locking action between the frame 60 and the table 12. The lock lever 82 can be used in combination with the quick clamp 84 so as to provide a double locking action.

The rear section 64 of the frame 60 as illustrated in FIGS. 1 and 2 has a pair of brackets of which the front bracket 104 is integrally formed and extends a short distance vertically upwardly with an aperture 106 formed centrally therein, and the rear bracket 108 is vertically elongated and connected at the rear end of the frame 60 by screws 110 as shown in FIG. 2 above which an aperture 112 is formed in alignment with the aperture 106. The upper left side of the bracket 108 as viewed in FIGS. 1 and 3 has a flange 114 which slopes outwardly and downwardly from the bracket 108. An arcuate slot 116 is formed in the flange 114 at a radial line measured from the center of the aperture 112. A post 118 has its lower end 120 disposed between the brackets 104 and 108 to be connected therebetween by a bolt 122 having its threaded end receiving a nut 124, which connection defines a pivotal axis 126. The bolt passes through an aperture 128 formed centrally in the lower end 120 and fitted with a pair of bushings 130 to aid in the pivotal movement of the post 118 relative to the frame 60 as illustrated in FIG. 2. An integral nut 132 is formed adjacent the upper end of the post 118 in alignment with the arcuate slot 116 and at the same radial distance thereof from the axis 126. A threaded clamp 134 extends through the slot 116 of the flange 114 to be threadedly received in the nut 132 to lock the post 118 at a desired angle of cut relative to a vertical plane, with the post 118 shown in FIGS. 1 and 2 corresponding to a vertical or straight angle of cut which places the saw blade 30 in a plane perpendicular to the horizontal plane of the top surface 18. The upper forward surface of the flange 114 is beveled at 135 and marked with a suitable angular scale 137 to which a pointer 140 will be aligned to indicate the angle position of the post 118 between the angles of 0° to 45° as shown in FIGS. 1 and 3.

Figure 4:
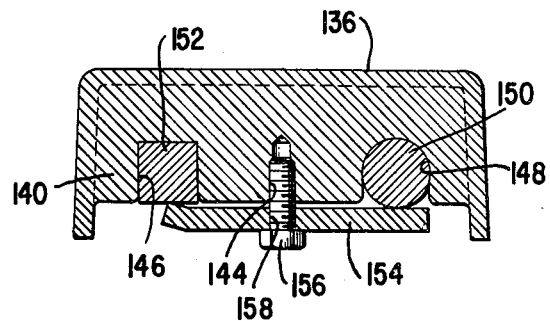
FIG. 4 is a front elevational view, partly in section, taken along line 4—4 of FIG. 2.

A support arm 136 is affixed atop the post 118 by screws 138 as shown in FIG. 2 to cantilever over the work table 12. A front rib 140 and a rear rib 142 are formed transversely within the support arm 136 with each having a central tapped hole 144 and as viewed in FIG. 4 a square opening 146 on the left side and a circular opening 148 on the right side. A round support rod 150 is received in the aligned circular openings 148, 148 of the front and rear ribs 140 and 142, respectively, to extend a short distance beyond each as illustrated in FIG. 2. A square rod 152, having a length equal to the round bar 150 and disposed parallel thereto, is received in the square openings 146, 146 of the front and rear ribs 140 and 142, respectively. The pair of support rods 150 and 152 respectively are affixed to the ribs 140 and 142 by a holding bar 154 held in transverse position by a bolt 156 passing through an aperture 158 to be threadedly received in the tapped hole 144 of the respective ribs 140 and 142. The underside of the bar 154 engages the bottom of the round bar 150 which extends slightly below the bottom of the respective ribs 140 and 142, while the square rod 152 has a slightly smaller dimension which is easily accommodated by the adjacent end of the bar 154 being bent upwardly to engage the bottom of the square rod 152. Thus the bar 154 is mounted parallel to the bottom of the respective ribs 140 and 142 and securely affixes the support rods 150 and 152 therein. The rods 150 and 152 are parallel to the frame 60 and the top surface 18 of the table 12.

Figure 3:
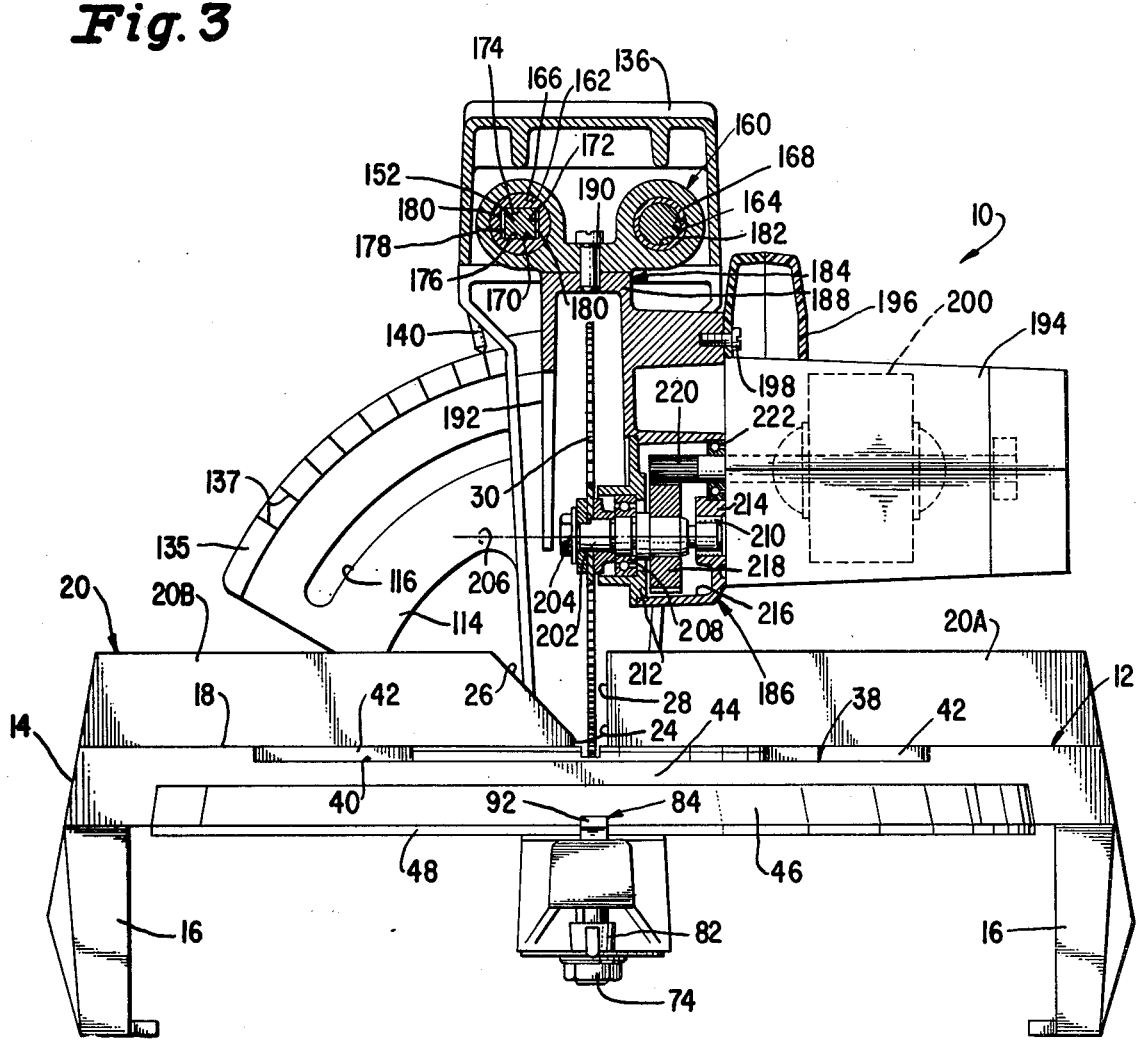
FIG. 3 is a front elevational view, partly in section, taken along line 3—3 of FIG. 2.

A slide 160 shown in FIGS. 1 and 3 has a pair of spaced apart longitudinal circular apertures 162 and 164 fitted with sleeve bearings 166 and 168, respectively. The bearing 166 shown in greater detail in FIG. 5 has a circular outer circumference and is non-rotatably affixed within the aperture 162. A rectangular opening 170 extends the length of the bearing 166 and has its shorter side 172, 172 extending from top 174 to bottom 176 a distance substantially equal to the side 178 dimension of the square rod 152 which is in close fitting sliding engagement therein. However, the length of the top 174 and bottom 176 is substantially greater so as to provide a clearance space 180 between the rod 152 and each of the sides 172, 172. The clearance 180 permits a lessening of the otherwise strict manufacturing tolerances, and facilitates the sliding action of the slide 160 by providing the clearance 180 that protects against binding which might otherwise occur due to transverse misalignment, warpage, or general non-parallelism of the rods 150 and 152. The bearing 168 is a conventional sleeve bearing with a circular outer periphery which is non-rotatably received in the aperture 164, and a circular inner aperture 182 of a diameter substantially equal to the outer diameter of the rod 150 which is received therein for close sliding engagement therebetween.

The radial saw has a saw casing 184 which includes the slide 160 and a saw housing 186 which has an intermediate bracket 188 connected to the slide 160 by screws 190 as illustrated in FIG. 3. A fixed blade housing 192 is formed integrally with the intermediate bracket 188 as illustrated in FIGS. 2 and 3 to enclose the upper portion of the outer circumference of the circular saw blade 30 and the cutting teeth thereof. The saw housing 186 includes the fixed blade housing 192, and also a motor housing 194 formed on the right side of the fixed blade housing 192 as viewed in FIGS. 1 and 3. A handle 196 shown in FIGS. 1, 2, and 3 is connected to the fixed blade housing 192 by screws 198 (FIG. 3), and extends from the forward side of the motor housing 194. A switch (not shown) is mounted in the handle 196 to activate an electric motor 200, depicted in FIG. 3, journaled in the motor housing 194.

The saw blade 30 is mounted on a spindle 202 by a bolt 204 to be rotated about an axis of rotation 206 as illustrated in FIG. 3. The spindle 202 is journaled in a pair of axially spaced bearings 208 and 210 which are mounted separately in an outer hub 212 and an inner hub 214 respectively, of the saw housing 186. The spindle 202 extends into a gear chamber 216, and has affixed thereto a driven gear 218. A pinion 220 extends from the motor housing 194 beyond a journal bearing 222 into the gear chamber 216 for engagement with the driven gear 218 to drive the same during operation of the motor 200.

The radial saw 10 is shown in the stored non-cutting position in FIG. 2 wherein the slide 160 of the saw casing 184 is positioned on the rods 150 and 152 adjacent the rear rib 142 to place the saw blade 30 behind the fence 20 which in FIG. 2 is on the leftward side thereof. Since the saw blade 30 is behind the fence 20 no cutting of the workpiece 32 is possible in this position. In order to initiate the cutting operation the operator after actuating the motor 200 will grasp the handle 196 and move the saw housing 184 forwardly so as to slide the slide 160 rightwardly along the rods 150 and 152 as viewed in FIGS. 1 and 2.

The slide 160 will permit the saw casing 184 to partake of a reciprocatory motion between its stored non-cutting rearward position illustrated in FIG. 2, and a cutting position wherein the circular saw blade 30 will be drawn rightwardly of the position shown in FIG. 2 to pass through the cutting slot 24 to engage the workpiece 32 and cut the same. The limits of travel of the slide 60 are set by the front rib 140 and the rear rib 142. Once the saw blade 30 crosses into and through the cutting slot 24 the radial saw 10 is in the cutting position and will remain so until it is returned to the stored position.

Figure 5:
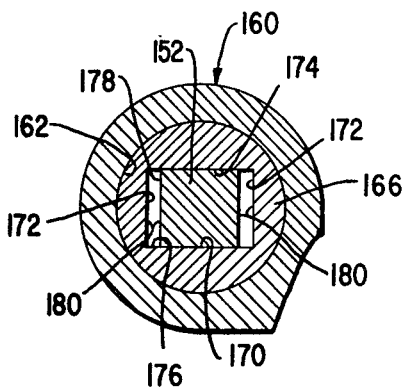
FIG. 5 is an enlarged fragmentary view of the slide showing the square rod journaled therein.

The rods 150 and 152 are sized to coact and equally share the load of the saw casing 184. The round rod 150 provides unwavering longitudinal and transverse stability, while the square rod 152 protects against the saw casing 184 rotating about the rod 150, and also provides rigid longitudinal support and flexible transverse support as illustrated in FIGS. 3 and 5.

It will be understood that various changes in the details, materials, arrangements of parts and operating conditions which have been herein described and illustrated in order to explain the nature of the invention may be made by those skilled in the art within the principles and scope of the invention.

Having thus set forth the nature of this invention, what is claimed herein is:

1. A radial saw comprising:
   (a) a table having a work support surface,
   (b) a frame connected to the table and disposed under the work support surface,
   (c) a post connected to the frame remote from the table,
   (d) a support arm connected to the post to cantilever over the work support surface,
   (e) a pair of support rods, one round and one square, affixed to the support arm,
   (f) a slide means holding a pair of bearings,
   (g) one of the bearings being formed with a cylindrically shaped bearing surface arranged to embrace the round rod in close fit for sliding motion thereon,
   (h) the other bearing being formed with a rectangularly shaped bearing surface arranged to embrace the square rod in loose fit in the direction toward and away from the round support rod and a close fit in the direction perpendicular thereto for sliding motion thereon, and
   (i) a saw motor carried by the slide means to be moved therewith in translatory motion across the work support surface.

2. A radial saw as set forth in claim 1 in which:
   (a) the post is pivotably connected to the frame,
   (b) a bracket is formed on the frame adjacent to the post,
   (c) an arcuate slot is formed on one side of the post above the pivotal connection,
   (d) a clamping means extends through the slot to connect the post to the frame at a predetermined vertical angle of cut, and
   (e) the cylindrical bearing embracing the round guide rod in a close fit maintains a predetermined cutting line of the radial saw in any vertical angle of cut and the rectangular bearing embracing the square rod in a close fit perpendicular to the direction toward and away from the round support rod provides for predetermined angular orientation of the cutting line of the radial saw in any vertical angle of cut.

* * * * *